US011155392B2

United States Patent
Gonzalez Pascual

(10) Patent No.: US 11,155,392 B2
(45) Date of Patent: Oct. 26, 2021

(54) DISPENSER INTEGRATED IN A CAP OF A CONTAINER FOR GRANULAR AND/OR POWDERED PRODUCTS

(71) Applicant: PROINSAL S.A.I.C., Río Negro (AR)

(72) Inventor: Juan Pablo Gonzalez Pascual, La Pampa (AR)

(73) Assignee: PROINSAL S.A.I.C., Rio Negro (AR)

( * ) Notice: Subject to any disclaimer, the term of this patent is extended or adjusted under 35 U.S.C. 154(b) by 0 days.

(21) Appl. No.: 17/016,979

(22) Filed: Sep. 10, 2020

(65) Prior Publication Data
US 2021/0086962 A1  Mar. 25, 2021

(30) Foreign Application Priority Data
Sep. 23, 2019  (AR) ............................ P20190102594

(51) Int. Cl.
*B65D 47/20* (2006.01)
*B65D 47/08* (2006.01)
(Continued)

(52) U.S. Cl.
CPC ....... *B65D 47/2012* (2013.01); *B65D 47/065* (2013.01); *B65D 47/0857* (2013.01); *G01F 11/20* (2013.01); *G01F 11/24* (2013.01); *G01F 11/261* (2013.01); *A47G 19/24* (2013.01); *B65D 2547/063* (2013.01)

(58) Field of Classification Search
CPC .............. B65D 47/2012; B65D 47/248; B65D 47/249; B65D 47/20; B65D 47/26; B65D 47/261; B65D 47/263; B65D 47/266; B65D 47/268; B65D 47/30; B65D 47/305; B65D 47/065; B65D 47/12; B65D 47/127; B65D 47/128; B65D 47/0857; B65D 47/0861; B65D 47/0876; B65D 47/088; B65D 2547/06; B65D 2547/063; B65D 2547/066; G01F 11/261; G01F 11/24; G01F 11/20; A47G 19/24
USPC .... 222/167–170, 20–21, 354–355, 359–360, 222/361–363, 367–369, 441–444, 457
See application file for complete search history.

(56) References Cited

U.S. PATENT DOCUMENTS 347,455 A * 8/1886 Wonacott
874,757 A * 12/1907 Fox
(Continued)

*Primary Examiner* — Donnell A Long
(74) *Attorney, Agent, or Firm* — Hoglund & Pamias, PSC; Roberto J. Rios

(57) ABSTRACT

A dispenser (a) applicable to cap of a container (b) for granular and/or powdered products. The present dispenser (a) comprises a cylindrical body chute (10) with the required capacity, which is mounted with the possibility of relative rotation, on a virtual longitudinal (11) axis, in a cradle (2) formed on the wall of a lateral recess of the cap (b) of the container (c), being said chute provided with a projecting peripheral flap (14) acting as a manually operated turning means. The wall of the cradle (2) has an opening (3) facing the interior of the container (c) and the chute (10) has first and second openings (12-13) angularly separated. Chute (10) can run between a product loading position, with the first opening (12) facing the opening (3) of the cradle and the second opening (13) closed by the wall of the cradle, and a product discharge position, with the first opening (12) closed by the wall of the cradle (2) and the second opening (13) facing the outside of the cap.

3 Claims, 3 Drawing Sheets

(51) Int. Cl.
*B65D 47/06* (2006.01)
*G01F 11/26* (2006.01)
*G01F 11/24* (2006.01)
*G01F 11/20* (2006.01)
*A47G 19/24* (2006.01)

(56) References Cited

U.S. PATENT DOCUMENTS

| | | | | |
|---|---|---|---|---|
| 1,961,173 A * | 6/1934 | Schutte | | B65D 47/30 |
| | | | | 222/516 |
| 2,154,283 A * | 4/1939 | Reisdorf | | G01F 11/24 |
| | | | | 222/196 |
| 2,424,675 A * | 7/1947 | Wood | | B65D 47/30 |
| | | | | 222/368 |
| 4,162,751 A * | 7/1979 | Hetland | | G01F 11/24 |
| | | | | 222/293 |
| 4,181,246 A * | 1/1980 | Norris | | B65D 41/18 |
| | | | | 215/313 |
| 4,890,535 A * | 1/1990 | Bieber | | F42B 33/0292 |
| | | | | 141/167 |
| 4,989,759 A * | 2/1991 | Gangloff | | A47G 19/34 |
| | | | | 222/153.13 |
| 5,169,036 A * | 12/1992 | Tong | | A47G 19/34 |
| | | | | 222/339 |
| 6,032,813 A * | 3/2000 | Niermann | | B01L 3/50825 |
| | | | | 215/312 |
| 6,059,148 A * | 5/2000 | Keller | | F16K 5/0605 |
| | | | | 222/219 |
| 6,705,482 B2 * | 3/2004 | Savitz | | B01L 3/50825 |
| | | | | 215/312 |
| 8,851,338 B2 * | 10/2014 | Zarou | | G01F 23/261 |
| | | | | 222/368 |
| 2010/0270331 A1 * | 10/2010 | Cummins | | A47G 19/24 |
| | | | | 222/143 |
| 2020/0307873 A1 * | 10/2020 | Berresheim | | A47G 19/2272 |

* cited by examiner

DISPENSER INTEGRATED IN A CAP OF A CONTAINER FOR GRANULAR AND/OR POWDERED PRODUCTS

TECHNICAL FIELD OF THE INVENTION

The present invention relates to a dispenser applicable to the cap of a container for granular and/or powdered products, for example edible salt.

STATE OF THE ART AND PROBLEMS TO BE SOLVED

Organizations like the WHO (World Health Organization) have expressed themselves on the excessive consumption of salt, have manifested their concern about the excessive consumption of salt, recommending the reduction of the intake of such product in adult people to 0.5 gr. per day to improve cardiovascular health without losing essential minerals for their well-being.

For these reasons, it is necessary to have means that enable the easy and precise dosing of this product.

Currently, containers used for salt are fitted with caps having dispensing means including holes of varied section that allow the more or less regulated dispensing of the product.

A known embodiment comprises a disc having a portion with a wider opening and another portion with small perforations. The disc is mounted in a way that allows a manual rotation, by means of an upper flap, in a track of the upper wall of the cap of the product container (salt). The track wall has an opening with which the perforated sectors of the disc can be selectively paired, for the product dispensing.

Dispensers like the ones mentioned above, allow to regulate the outflow of more or less salt but do not permit the correct and precise dosage in the required quantities.

BRIEF DESCRIPTION OF THE INVENTION

In view of the above and taking into consideration the current state of the art in the subject matter, the present invention discloses a dispenser applicable to the cap of a container for granular and/or powdered products. This dispenser comprises a cylindrical body chute with the required capacity, which is mounted with the possibility of relative rotation, on a virtual longitudinal axis, in a cradle formed on the wall of a side recess in the container cap, being said chute provided with a projecting peripheral flap acting as a manually operated turning means.

The wall of said cradle has an opening facing the interior of the container and the chute has first and second angularly spaced openings. The chute is capable of running between a loading position of the product, with the first opening facing the cradle opening and the second opening closed by the cradle wall, and a product discharge position, with the first opening closed by the cradle wall and the second opening facing the outside of the side recess of the cap.

Other characteristics and advantages of the object of the Invention shall be explained in the following description.

BRIEF DESCRIPTION OF THE DRAWINGS

Taking into consideration the purposes mentioned and others related, the invention consists of the details of construction and combination of parts as will be understood from the following description referring to the accompanied drawings, in which.

In these figures the same reference signs indicate equal or corresponding parts.

Figure 1:
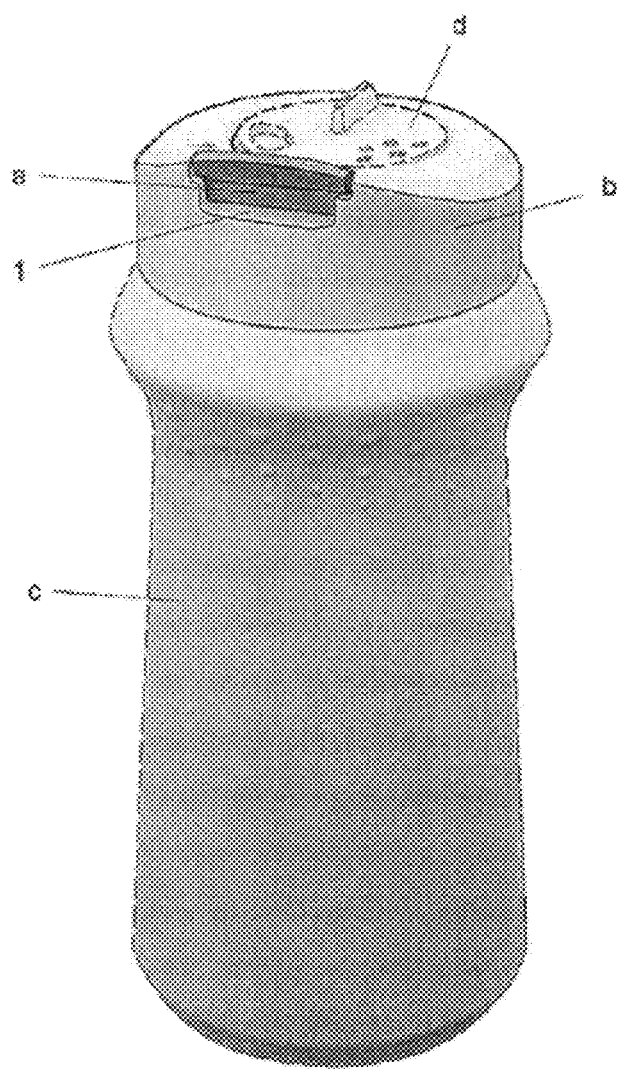
FIG. 1 is a perspective view of a container with fixed cap provided with a typical dispenser for powdery products; and incorporating the dispenser object of the present invention.

(a) Dispenser.
(b) Cap
(b') Cap opening for product outflow.
(c) Container.
(d) Dispenser disc.
(1) Lateral recess of the cap (b).
(2) Cradle-shaped wall portion of the recess (1).
(3) Wall opening (2).
(4-5) Longitudinal recesses in the wall (2).
(10) Cylindrical chute.
(11) Virtual axis of rotation of the chute (10).
(12) First opening or loading opening of the chute (10)
(13) Second opening or discharge opening of the chute (10)
(14) Manually operated flap of the chute (10)
(15-16) Longitudinal peripheral projections cooperative with recesses (4) and (5) for chute positioning (10).

DETAILED DESCRIPTION OF THE INVENTION

The present dispenser (a) is intended to be applied to caps (b) of containers (c) for granular and/or powdered products, particularly to dispense a precise amount of the product, for example salt.

With reference to FIG. 1, a container (c) like a salt shaker is illustrated, provided with a fixed cap (b) having an outlet opening (b') in its upper wall for the outflow of the product with a known dispensing disc (d).

The present dispenser (a) is adapted in the fixed cap (b) for which said cap has a lateral recess (1) with a cradle-shaped portion (2) in which it sits with the possibility of a relative rotation, a cylindrical body chute (10). The wall of said cradle (2) has an opening (3) facing the interior the container (c).

The chute (10) has a capacity for a predetermined quantity of the product to be dosed and pivots on a longitudinal virtual axis (11).

The chute (10) wall has a first opening (12) and a second opening (13) separated by 90°.

The chute (10) thus constituted can run between two operating positions, namely: a loading position of the product and a discharge position.

Figure 2:
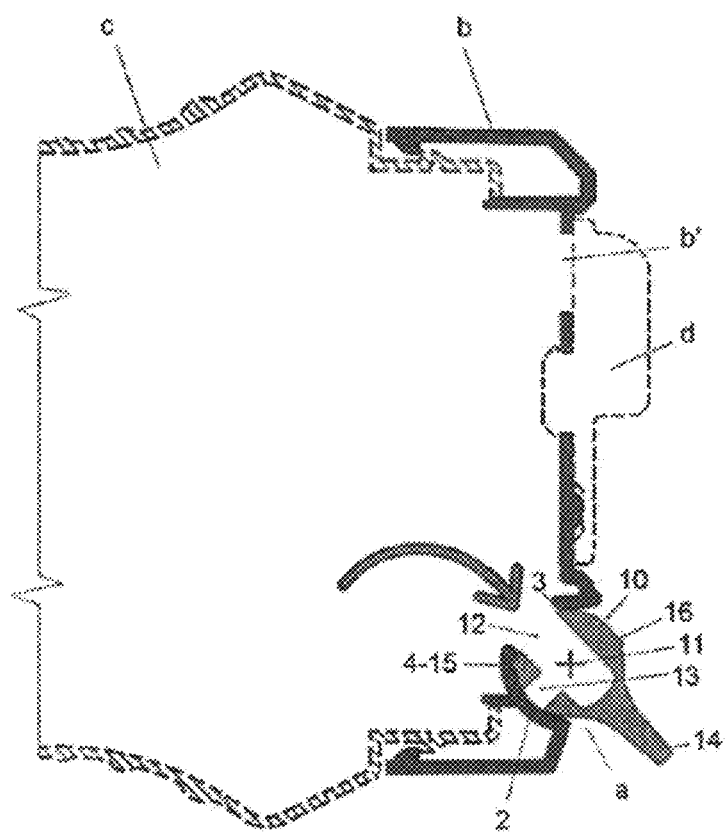
FIG. 2 is a partial sectional view of the container with cap according to FIG. 1, showing in detail the present dispenser in the product loading position.

In the loading position (FIG. 2), the opening (12) of the chute coincides with the opening (3) of the cradle and the opening (13) is closed because it is facing the blind wall of said cradle (2). In this position, when leaning the container towards the corresponding side (c), the quantity of product to be dosed enters filling the chute (10).

Figure 3:
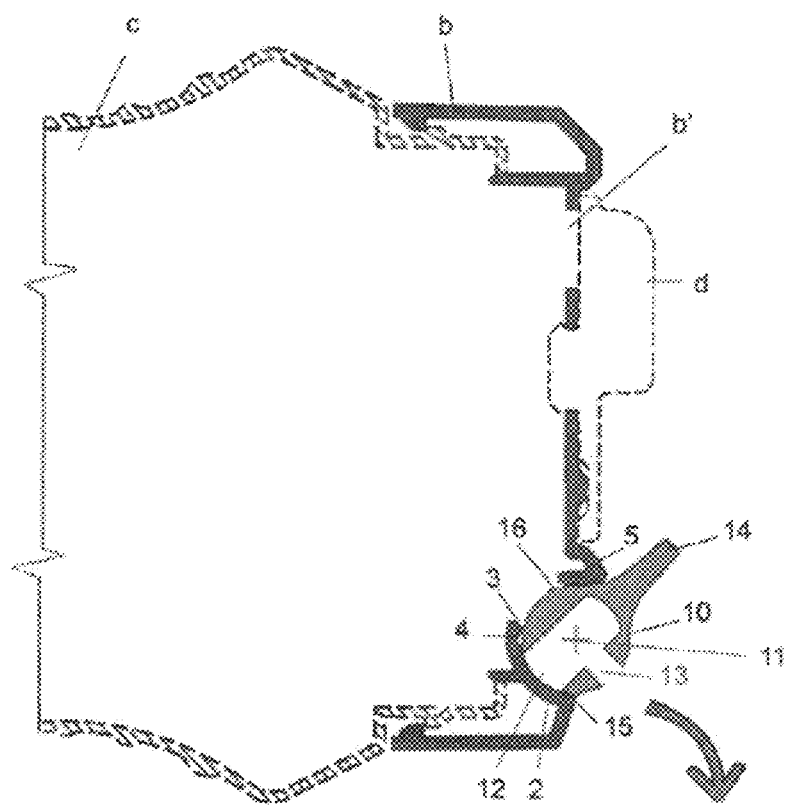
FIG. 3 is another partial sectional view of the container with cap according to FIG. 1, showing in detail the present dispenser in the product discharge position.

In the discharge position (FIG. 3), the loading opening (12) is closed because it faces the blind portion of the cradle wall (2), while the second opening (13) is positioned towards the outside, allowing the outflow of the product.

For the operational positioning the chute body (10) has a projecting peripheral flap (14) as a manually operated turning means.

Chute loading and discharge positions are determined by two half-round peripheral longitudinal projections (15) and (16) of the chute wall, related in a matching position with a pair of congruent longitudinal recesses (4) and (5) of the cradle wall (2).

Having thus described and determined the nature of the present invention and how it is to be put into practice, the following is claimed:

1. A dispenser provided on a cap of a granular and/or powdered products container, said dispenser comprising:

an outlet opening provided in an upper wall of a cap and a dispenser disc positioned over said outlet opening for the outflow of a product;

a cylindrical body chute positioned on a cradle-shaped portion of a lateral recess of said cap, said cylindrical body chute being configured to rotate inside said cradle-shaped portion, wherein an opening configured to face an interior of a container is provided on a wall of said cradle-shaped portion;

said cylindrical body chute has a first opening and a second opening angularly separated from said first opening, wherein said first opening faces the opening configured to face the interior of said container and said second opening faces the wall of said cradle-shaped portion when the product is being loaded into said cylindrical body chute, and said first opening faces the wall of said cradle-shaped portion and said second opening faces outside of the lateral recess of the cap when said product is being discharged from inside said cylindrical body chute; and a projecting peripheral flap provided on said cylindrical body chute for moving said cylindrical body chute between a product loading position and a product discharging position.

2. The dispenser according to claim 1, wherein said first opening and said second opening are angularly separated at an angle of 90°.

3. The dispenser according to claim 1, further comprising two peripheral longitudinal half-round projections provided on an external wall of said cylindrical body chute and a pair of congruent longitudinal recesses provided on said cradle-shaped portion, wherein said product loading position and said product discharging position are determined when said two peripheral longitudinal half-round projections are in a matching position with said pair of congruent longitudinal recesses.

* * * * *